United States Patent [19]
Williams

[11] Patent Number: 4,786,985
[45] Date of Patent: Nov. 22, 1988

[54] METHOD AND APPARATUS FOR EXTRACTING BINARY SIGNALS INCLUDED IN VERTICAL BLANKING INTERVALS OF VIDEO SIGNALS

[75] Inventor: Marshall Williams, Fremont, Calif.

[73] Assignee: Ampex Corporation, Redwood City, Calif.

[21] Appl. No.: 899,278

[22] Filed: Aug. 21, 1986

[51] Int. Cl.⁴ .................... A04N 5/91; G11B 20/10
[52] U.S. Cl. .................... 360/33.1; 360/73; 360/37.1; 360/72.2; 360/27; 360/49; 360/51
[58] Field of Search ............ 360/33.1, 73, 36.2, 360/37.1, 19.1, 18, 72.2, 74.4, 14.3, 32, 27, 49, 51, 31, 10.1, 10.3; 358/343

[56] References Cited

U.S. PATENT DOCUMENTS

| | | | |
|---|---|---|---|
| 2,903,677 | 9/1959 | Curtis | 360/51 |
| 3,673,391 | 6/1972 | Lougheed | 235/150.3 |
| 3,831,196 | 8/1974 | Thorpe | 360/52 |
| 3,870,963 | 3/1975 | Groce et al. | 328/59 |
| 3,952,253 | 4/1976 | DeVolpi et al. | 328/63 |
| 4,039,960 | 8/1977 | Clark | 328/155 |
| 4,216,544 | 8/1980 | Boleda et al. | 375/119 |
| 4,217,655 | 8/1980 | Michalski | 364/701 |
| 4,255,793 | 3/1981 | Nakamura | 364/701 |
| 4,280,099 | 7/1981 | Rattlingourd | 328/63 |
| 4,473,850 | 9/1984 | Foerster | 360/9.1 |
| 4,473,853 | 9/1984 | Corkery | 360/72.2 |
| 4,486,892 | 12/1984 | Karijuku | 377/43 |
| 4,525,754 | 6/1985 | Handley | 360/51 |
| 4,587,573 | 5/1986 | Odaka | 360/10.3 |
| 4,669,000 | 5/1987 | Odaka | 360/32 |

*Primary Examiner*—Alan Faber
*Attorney, Agent, or Firm*—Bradley A. Perkins; George B. Almeida; Richard P. Lange

[57] ABSTRACT

An apparatus and method for the extraction of vertical interval time code (VITC) included in the vertical blanking interval of a television signal reproduced from video tape transported past a rotating transducer over a wide range of speeds. VITC information is extracted at a rate derived from the rate of a control signal having a rate proportional to the velocity at which the tape is transported past the transducer.

20 Claims, 4 Drawing Sheets

FIG_1

METHOD AND APPARATUS FOR EXTRACTING BINARY SIGNALS INCLUDED IN VERTICAL BLANKING INTERVALS OF VIDEO SIGNALS

This invention relates generally to the extraction of binary signals included in an information signal reproduced from a tape by a transducer rotated relative to the tape. More particularly, it relates to a method and apparatus for extracting binary signals from an information signal reproduced by a rotating transducer from a tape transported over a range of velocities.

Frequently, a number of different information signals are combined to form a composite information signal for transmission to a user. When received by a user, the different information signals often must be separated or extracted from the composite information signal before they are used in the intended manner. Television signals commonly are a composite of video signals and one or more other information signals inserted in the vertical blanking interval that separates consecutive fields of video information. Common forms of such other information signals are closed caption data for the hearing impaired, other teletext data, vertical interval signals (commonly designated VIR) and vertical interval time code signals (commonly designated VITC). Such signals are in binary form comprised of selected numbers of binary data bits occurring at intervals determined by a data encoding clock signal. Presently, these binary signals are in the form of a non-self-clocking, non-return-to-zero code, which hereinafter will be referred to as the NRZ code.

In the television broadcast industry, users manipulate received video information in a variety of ways to produce broadcastable program material. One method of manipulation is through editing, a process of electronic cutting of video information into segments defined by selected edit points and combining of the segments to form a desired video program. Video information can be edited on a visual basis where the operator selects the edit points while viewing a display of the video information on a monitor. However, this is a time-consuming method, which does not lend itself to precision definition of the edit points. Therefore, it is usually desirable and sometimes necessary to employ an electronic technique of selecting the edit points with a high degree of precision.

One method of achieving a more rapid and precise edit point selection is to use some form of indexing of the video information. One common form of indexing is called time code. Time codes specify, i.e., address, consecutive portions of video information according to a sequential numbering system in units corresponding to time, and are associated with the video information by two common methods. According to one method employed in helical scan video tape recorders, a time code signal in binary form is recorded in a track extending longitudinally along the tape. Each time code address contained in the signal is located to identify a pair of video fields recorded in two separate, usually adjacent, tracks extending diagonally across the tape. This time code format is called longitudinal time code. Two longitudinal time code standards have been adopted for the various broadcast television signal standards used throughout the world. One established by the Society of Motion Picture and Television Engineers (SMPTE) is for television signals having a 60 hertz field rate, with two interlaced fields forming a frame of 525 horizontal lines. The European Broadcasters Union (EBU) has also established a longitudinal time code standard for television signals having a 50 hertz field rate, with two interlaced fields forming a frame of 625 horizontal lines. The time code specified by each of these standards identifies frames, i.e. two consecutive interlaced fields, of video information, with each one of a series of consecutive frames identified by a unique time code address in units of hours, minutes, seconds and frames.

These longitudinal time code signals are in the form of a continuously recorded signal in a self-clocking, bi-phase mark code called Manchester. Because of the self-clocking feature of the code and continuous nature of the signal, it is possible to determine the rate at which the longitudinal time code is reproduced from the tape over a wide range of tape speeds in both the forward and reverse directions of tape transport. However, longitudinal time codes have several significant short comings. The longitudinal time code and associated video signal are recorded separately on the tape and, when reproduced, are processed through separate channels which must be operated synchronously to preserve the addressing relationship between the reproduced time code and video signals. Furthermore, this separation of time code and video signals frequently results in the improper recording of time code, particularly, during edit operations, and in some cases a failure to record time code on the tape. Consequently, it is often necessary to erase and re-record a time code signal on a tape to correct an improperly recorded time code signal or to supply missing time code information.

Another serious short coming associated with longitudinal time code is that it cannot be reproduced from the tape when its transport is stopped, i.e., when the tape velocity is zero. In modern helical scan video tape recorders designed for broadcast television applications, there is a need for a time code even when the transport of the tape is stopped. Moreover, it is desirable to have the time code and video information transmitted together in the same signal channel to avoid the risk of the absence of time code and the loss in the relationship between addresses of the time code signal and the frames of the video signal identified by the addresses.

To satisfy these needs and desires, a second method of associating time codes and video information has been developed, which is called the vertical interval time code, or VITC. In accordance with this second method, the time code is inserted in the video signal to form a composite signal that can be processed, recorded, reproduced and transmitted through a single channel. However, this time code does not occur continuously throughout the video signal. Instead, it is inserted at intervals in the vertical blanking period of the video signal. Typically, each time code address is inserted within an interval corresponding to one horizontal line period of the video signal, a very short interval in comparison to the interval within which one address of the longitudinal time code is recorded along the tape.

The VITC time code that is inserted in the video information signal identifies the video signal according to a similar address format described previously with reference to the longitudinal time code, namely, a numerical sequence in units of hours, minutes, seconds and frames, and as briefly discussed hereinbefore, is in the form of a binary signal encoded according to a non-self-clocking NRZ code. However, it includes information capable of distinguishing the two interlaced fields of a frame identified by the same address number. For systems designed according to 60 hertz, 525 line television signal standards, the VITC time code is in the form defined by SMPTE. A standard adopted by the EBU defines the form of VITC time code used in systems designed according to the 50 hertz, 625 line television signal standards.

Each VITC time code address specified by the SMPTE standard is inserted in each field on any two non-adjacent lines within the vertical blanking interval of the video signal. The time code address is inserted twice in each field for redundancy that enhances the opportunity to recover the time code address, particularly, from a recording on tape. In helical scan video tape recorders designed according to the Type C format for broadcast television applications, the VITC time code is employed to identify addressed fields when video signals are reproduced over a small range of velocities of transport of the tape, during which the rate of reproduction of the recorded signals can be determined continuously from information included in the reproduced video signals. The rate of reproduction must be determined in order to derive a clock signal whose rate corresponds to the rate of reproduction of the non-self-clocking VITC time code signal so that the occurrence of time code signal in the video signal can be detected and decoded. Because the VITC time code occurs at intervals or intermittently in the video signal and is non-self-clocking, a clock signal for detecting and decoding the intermittently occurring time code signal must be derived from a source other than the VITC time code signal itself.

In present day helical scan video tape recorders, the horizontal synchronizing signals included in the reproduced video signals are commonly used to generate a clock signal having a rate corresponding to the rate of reproduction of signals from the tape. Such tape recorders are provided with transducers that are supported for controlled displacement relative to the transverse direction of the tracks of video signals that extend diagonally across the tape. This permits the position of the transducer to be controlled relative to recorded tracks on the tape when the velocity of the tape is other than the normal record and reproduce velocity. In doing so, the transducer can be maintained in registration with the tracks of recorded video signals. With such transducers, the horizontal synchronizing signals can be reproduced and used to generate the clock signal needed to detect and decode the VITC time code signal as the velocity of transport of the tape is varied. However, the range of movement of such transducers is limited in such recorders, and registration between the transducer and the tracks of recorded video signals is lost when the speed of transport of the tape in the forward direction of tape transport exceeds about three times the normal record and reproduce speed, and about one times the normal record and reproduce speed when the tape is transported in the reverse direction. At tape transport speeds outside this range, the transducer crosses the tracks of recorded video signals. When the cross tracking becomes severe, usually at speeds of tape transport in the forward and reverse directions exceeding three times the normal record and reproduce speed, horizontal synchronizing signals can no longer be reproduced continuously for a sufficient time that permits deriving the needed clock signal faithfully. Consequently, the VITC time code can no longer be reliably detected and decoded.

It should be appreciated that other binary information signals in the form of a non-self-clocking NRZ code which are included in the vertical blanking interval of the video signal also require a clock signal having a rate corresponding to the rate of reproduction of the video signals in order to be detected and decoded upon reproduction from a tape. As in the case of the VITC time code signal, it has not been possible to detect and decode such signals reliably beyond a limited range of velocities of tape transport.

Therefore, a need exists for a technique that permits detection and decoding of binary signals included in a video or other information signal reproduced by a rotating transducer from a tape transported past the transducer over a wide range of velocities. Moreover, particular advantages will be realized from a technique that permits a VITC time code to be detected, extracted and decoded for use when the tape from which they are reproduced is transported at velocities causing severe cross tracking of recorded video signals by a rotating transducer. Additional advantages will be achieved by a technique that enables VITC time code signals to be detected, extracted and decoded at various velocities of tape transport without the need of transducers that are transversely displaceable relative to recorded tracks on the tape.

In accordance with the present invention, advantage is taken of the predictable relationship between the velocity at which a tape is transported past a rotating transducer and the relative tape to transducer velocity produced by the transport of the tape and the rotation of the transducer. More specifically, as the transducer is rotated at a specified constant velocity to reproduce information signals from a tape, a relative tape to transducer velocity is established that is a known function of the speed at which the tape is transported past the rotating transducer and the direction in which the tape is transported. Furthermore, the rate at which information signals are reproduced from the tape by the rotating transducer is directly related to and is defined by the relative tape to transducer velocity. To obtain a continuous clock signal whose frequency, or rate, corresponds to the relative tape to transducer velocity, hence, the rate at which the information signals are reproduced, a signal is generated in response to the transport of the tape at a rate that is proportional to the velocity (i.e., tape transport speed and direction) at which the tape is transported past the rotating transducer. This signal is coupled to control the generation of a timing or clock signal so that its rate corresponds to the relative tape to transducer velocity, hence, necessarily the rate at which the information signal is reproduced from the tape. Since it is possible to obtain a signal proportional to the velocity of tape transport at all times, for example, through the use of a tachometer mechanically coupled to respond to the transport of the tape or use of control signals reproduced from tracks extending longitudinally along the tape, a clock signal having a range corresponding to the rate at which the information signal is reproduced from the tape can be continuously generated throughout the velocity range of tape transport. This clock signal is coupled to a detector that receives the reproduced information signal to control its operation in identifying the occurrence of a desired binary signal included in the received information signal. Typically, a binary signal inserted in an information signal will be accompanied by a known bit pattern of a selected number of bits to permit detection and decoding of the signal. The detector relies on this known bit pattern to identify the occurrence of the desired binary signal. More specifically, the detector periodically examines the received information signal at a rate determined by the clock signal. When the known bit pattern is detected, the detector signifies identification of the desired binary signal.

The various features and advantages of the present invention will become more apparent from the following description and claims considered together with the accompanying drawings, of which:

DETAILED DESCRIPTION

Figure 1:
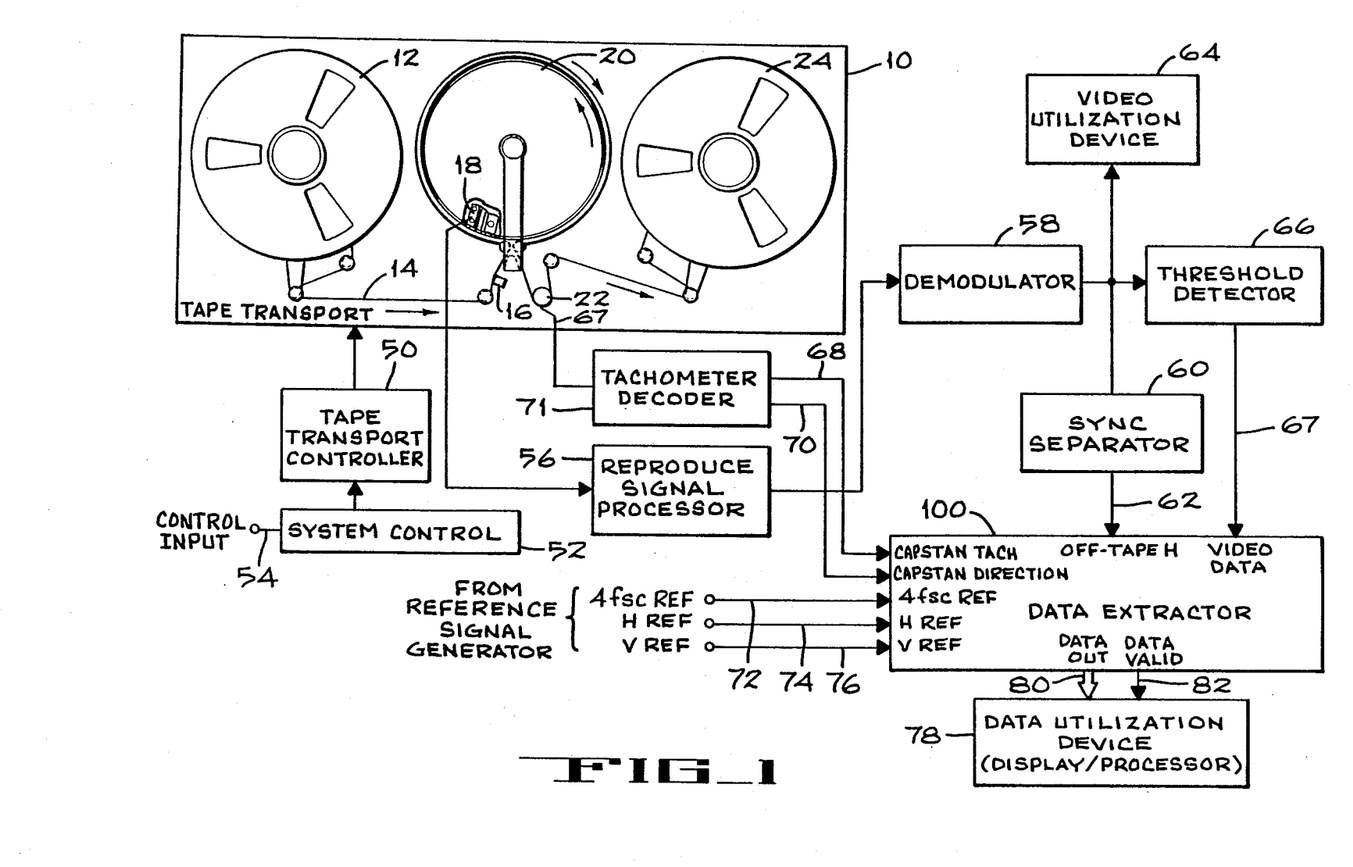
FIG. 1 is a simplified block diagram of a data extraction circuit in accordance with the present invention.

Referring to FIG. 1, a video tape transprrt 10 is used to transport video tape 14 past transducers. Video tape transport 10 is of conventional design.

Video tape 14 is fed off a video tape supply reel 12 in the direction indicated and at a selected velocity. The video tape is then guided into contact with a longitudinal transducer 16. Longitudinal transducer 16 can be used to read any longitudinal signal, such as audio, longitudinal time code or control track information. From longitudinal transducer 16, video tape 14 is transported around scanner 20.

Scanner 20 contains at least one transducer 18 to read video information off video tape 14. Scanner 20 may also include other transducers, such as erase and write transducers. Scanner 20 is of conventional design and rotates in the direction indicated at a fixed, known velocity so as to be able to read helically recorded tracks on video tape 14.

The precise velocity of rotation of scanner 20 and velocity of the video tape 14, at play velocity vary for different recording formats. However, the values for each format are specified by well known standards. Generally, at normal play speed, the rotation of the scanner 20, and thus transducer 18, is about 100 times the linear velocity of the tape. Accordingly, the relative speed of the transducer 18 to the video tape 14 is a combination of these speeds, slightly less than their arithmatic sum when the video tape 14 is being transported in the direction shown by the arrow in FIG. 1 (forward direction).

After leaving scanner 20, video tape 14 is fed into contact with a capstan 22. Capstan 22 is used to regulate the velocity of video tape 14 and is also of conventional design. After leaving capstan 22, video tape 14 is fed onto a take-up reel 24.

Tape transport 10 is controlled by tape transport controller 50, which is in turn controlled by system control 52. Operation of tape transport 10 is in response to control input signals 54 as interpreted by system control 52 and implemented by tape transport controller 50. Control input signals 54 may originate at a control panel operated by an operator, or may originate from a video editor. These signals specify an operating mode. System control 52 receives these signals and generates machine control signals that are sent to tape transport controller 50. Tape transport controller 50 interprets these signals and produces the signals necessary to control each element of tape transport 10.

By controlling the velocity and direction of capstan 22, supply reel 12, and take-up reel 24, a range of tape velocities, in both the forward and reverse direction, can be obtained. Tape transport 10 can be operated in play mode, stop mode, and shuttle mode (including variable play speed mode). In play mode, the direction of the tape is forward and the velocity of video tape 14 is fixed and equal to the velocity normally used to record video information. In stop mode, the video tape velocity is zero, but the scanner 20 is still rotating and video information can be read off tape at the scanner velocity. Shuttle mode is used to define movement of the tape in either direction and at any velocity. As a practical matter shuttle velocity is limited to plus or minus 50 times play velocity in even the fastest video tape tansports currently being used.

Both tape transport controller 50 and system control 52 are conventional and well known to those skilled in the art. Control input signals 54 can originate at an operator control panel or from a video editor.

Video information read off video tape 14 is fed to a reproduce signal processor 56. Reproduce signal processor 56 performs a number of operations such as equalization, automatic gain control, and drop out detection. Such processors are well known to those skilled in the art. Processed video information is fed out of reproduce signal processor 56 into a demodulator 58.

Demodulator 58 converts the processed video information from a frequency modulated signal as is used for recording on video tape to a standard video signal in a manner well known to those skilled in the art. The video signal outputted by demodulator 58 is fed to a sync separator 60, a video utilization device 64, and a threshold detector 66.

The video signal from demodulator 58 is fed to video utilization device 64. This can be any number of devices, such as a video monitor, another video tape recorder, or a television broadcast system.

Sync separator 60 separates the video synchronizing signals, such as the horizontal and vertical synchronizing signals from the remaining video signal. One of the synchronizing signals outputted by sync separator 60 is a horizontal synchronizing signal and it will be referred to as off-tape H reference signal 62. It is referred to as off-tape because it is derived from the actual horizontal sync pulses recorded on video tape 14, and in order to differentiate it from the horizontal reference signal to be discussed below. Off-tape H reference signal 62 is fed to a data extractor 100. The design of sync separator 60 is conventional and well known to those skilled in the art.

Threshold detector 66 also receives the video signal from demodulator 58. The function of threshold detector 66 is to convert the analog video signal to a stream of binary data. The standard NTSC video signal has an amplitude range from −40 IRE to +100 IRE. Where the binary data is VITC, the SMPTE standard for VITC specifies the analog amplitude levels the VITC is to be encoded on. A zero bit is represented by a video amplitude level of zero IRE and a one bit is represented in the video signal by an amplitude level of +80 IRE. The preferred embodiment of threshold detector compares the amplitude level of the incoming video signal from tape to a reference level. Preferably, the reference level is set to 40 IRE, although it could be set to other levels. Threshold detector 66 outputs a binary one when the analog video signal level is at or above a selected reference level of 40 IRE, and outputs a binary zero when the analog video signal level is below the selected reference level of 40 IRE. Operating in this manner, threshold detector 66 is a one bit analog to digital converter. This binary data is outputted as video data signal 67 to data extractor 100.

Data extractor 100 will be discussed in detail with reference to FIG. 2. In addition to off-tape H reference signal 62 and video data signal 67, there are five other input signals to data extractor 100. Two of the signals are capstan tach 68 and capstan direction 70. Both these signals are from tachometer decoder 71. Mechanically connected to capstan 22 is a tachometer (not shown) which produces a quadrature tachometer signal 67. These signals are fed into tachometer decoder 71 and decoded into a capstan tach signal 68 related to the rotation of capstan 22, and a capstan direction signal 70 indicative of the direction of rotation of the tachometer and thus provides an indication of direction of tape movement. Tachometer decoders are well known in the art and are commercially available as integrated circuits.

Capstans are used to regulate the movement of tape by mechanically engaging the tape to the capstan. One method is to use an opposing pinch roller which forces the tape into contact with the capstan and prevents most slippage. The preferred method for the present embodiment is to use a vacuum capstan. In a vacuum capstan, a vacuum from inside the capstan is used to hold the tape firmly to the capstan. Thus, although a small amount of tape/capstan slippage may occur, the movement of the capstan is generally related to the movement of the tape. Because movement of capstan 22 is locked to the movement of video tape 14, and that movement generates capstan tach signal 68, capstan tach signal 68 is a control signal having a rate proportional to the speed at which video tape is transported.

While capstan 22 is the preferred source of the control signal, a tachometer connected to other devices that are in mechanical connection to video tape 14, such as an idler, supply reel 12, or take-up reel 24, could also be used to generate the necessary signals, in a known manner.

Alternatively, video tapes generally are recorded with an information signal called the control track signal recorded on a longitudinal track. This control track signal, as read by longitudinal transducer 16, can be used as the control signal instead of capstan tach 68. The control track signal, as read by longitudinal transducer and decoded by a control track decoder, will produce a periodic signal having a rate proportional to the speed at which video tape 14 is transported. Use of the control track signal in this manner is well known those skilled in the art. A directional signal, such as capstan direction 70, can be derived from the control track signal.

There are three reference signals that are also fed into data extractor 100. A 4fsc reference signal 72, which is at a frequency of four times the rate of the video subcarrier frequency, is used as a high speed clock signal. This signal can be generated by a reference sync generator or can be generated by a simple crystal controlled oscillator. Either method is well known to those skilled in the art.

The other two reference signals are vertical reference or V reference 74, and horizontal reference or H reference 76. These are standard signals which are generated from a reference sync generator in a well known manner. V reference 74 occurs generally at the beginning of the vertical interval. H reference 76 occurs generally at the beginning of each line of video information.

There are two outputs from data extractor 100 which are both fed to a data utilization device 78. The first is data out 80. Data out 80 is the data extracted from video data 67 by data extractor 100. In the preferred embodiment of a VITC extractor, data out 80 s the VITC data in binary form.

The other output from data extractor 100 is a data valid signal 82. This signal indicates that valid data has been detected and is available from data out 80.

Data utilization device 78 can take many forms. Upon receiving the valid data signal 82, it should read in the data from data out 80. Typically this device functions as a decoder. In the case of VITC, the data must be decoded before being used. Once decoded, the data can be displayed for an operator, or it can be used by a processor to perform an edit at a certain point. Such data utilization devices are well known in the art.

Figure 2:
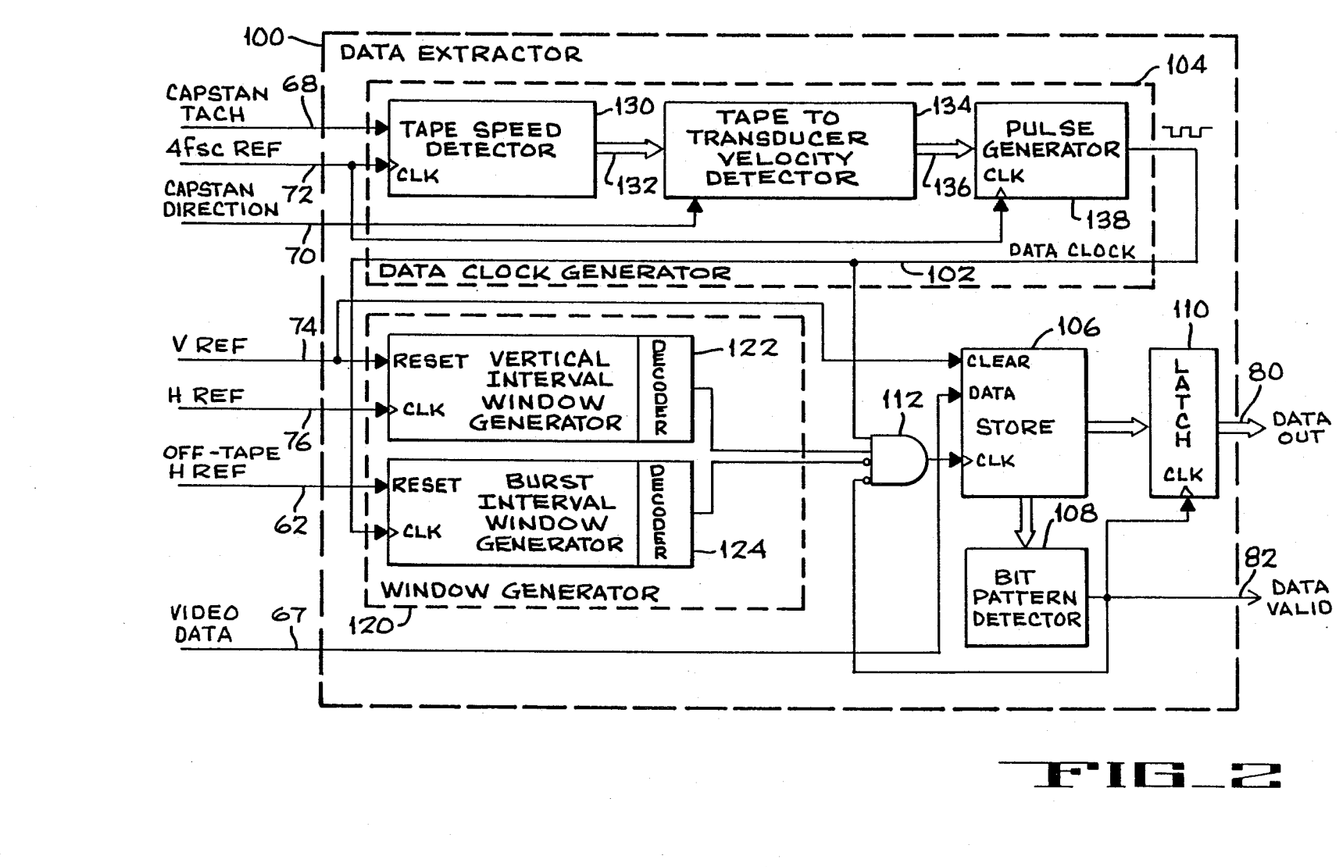
FIG. 2 is a simplified block diagram of a data extractor of FIG. 1.

Referring to FIG. 2, the function of data extractor 100 is to examine the incoming video data 67 to detect and extract valid data as data out 80.

In order to examine video data 67, the rate at which video data 67 is being inputted to data extractor 100 must be known. The rate of video data 67 is provided by a data clock signal 102, which is produced by a data clock generator 104.

Video data 67 is clocked into a store 106 by data clock signal 102, one bit at a time. Store 106 includes a shift register. As each new bit of video data 67 is clocked into store 106, the bits already in the shift register are shifted by one bit and the oldest bit in the register is dropped. For the preferred embodiment of a VITC extractor, the shift register is 90 bits long, because the standard for VITC specifies that the VITC is encoded into a 90 bit word.

The contents of store 106 are continuously being examined by bit pattern detector 108. For VITC, the desired bit pattern is made up of what the VITC standard calls sync bits. The sync bits are two bits, a one and a zero, that precede each eight bit byte of VITC data. When the desired bit pattern is detected, bit pattern detector outputs data valid signal 82. For VITC, bit pattern detector 108 can be implemented as a series of inverters and AND gates connected to the locations in the shift register of store 106 at which these sync bits must occur.

The data valid signal 82 from bit pattern detector 108 is used in a number of ways. First, it is passed out of data extractor 100 to data utilization device 78 (shown in FIG. 1) to indicate that valid data is available on data out 80.

The data valid signal 82 is also used to clock the data out of store 106 and into a latch 110. Latch 110 serves several functions. In the case of VITC, the 90 bit VITC word is read in parallel into the latch. However, it is generally inconvenient to move data from device to device in such a large word. It is more common to send data in 8 bit bytes. Latch 110 organizes data out 80 into 8 bit bytes to be sent in a more convenient manner.

While in the embodiment shown, only the one word of VITC is extracted, VITC is redundantly recorded on two lines in the vertical interval. Included in the VITC word is an error checking code called CRC. Data utilization device 78 (FIG. 1) normally checks this error checking code. If there is an error in the first VITC word, the second VITC word is needed. Latch 110 can be used to hold the first VITC word detected while store 106 holds the second redundant VITC word.

The data valid signal 82 is used to prevent the clocking of new video data 67 into store 106 after the desired bit pattern has been detected. The logic for this operation is provided by AND gate 112. AND gate 112 has four inputs as shown. Two of these inputs are used to regulate the interval of video data 67 actually examined, and these inputs will be discussed below. For the present discussion only the data clock signal 102 and valid data signal 82 need be considered. Until the desired bit pattern is detected, the valid data signal 82 will remain off. This signal is inverted on input to AND gate 112 and when ANDed with data clock 102, AND gate 112 outputs the data clock signal 102. When the desired bit pattern is detected, the valid data signal is turned on and, after being inverted and input to AND gate 112, it forms a negative input and AND gate 112 outputs a negative signal and video data 67 is not clocked into store 106.

This condition continues until the beginning of the next vertical interval as indicated by V reference 74. Upon the begining of a new vertical interval, V reference 74 clears store 106. The contents of the shift register is set to all zeros and valid data signal 82 is turned off because bit pattern detector 108 no longer detects the desired pattern. Clearly, the desired bit pattern cannot contain only zeros, as this would cause a permanent lock-up. The sync bit pattern for VITC contains a combination of ones and zeros.

The above discussed elements will provide the required extraction of data by data extractor 100. However, video data 67 contains a large amount of other data unrelated to the data desired to be extracted. To data extractor 100, this appears as a random bit stream. Because of the large amount of data being examined it is possible for the extractor to find the desired bit pattern in a random stream of data totally unrelated to data sought. While these erroneous words of data can be easily detected by the data utilization device 78 and ignored, the performance of data extractor 100 can be improved by window generator 120.

In the case of VITC, VITC data only occurs in the vertical interval. Thus, only the video data in the vertical interval need be examined. Additionally, every line of data in video data 67 has color burst information in it. This color burst information is highly random and can periodically form the desired bit pattern. Thus, it is advantageous to exclude the burst period from examination. The function of window generator 120 is to form a window of the size of the vertical blanking interval while excluding the burst period from each line.

The formation of this window is accomplished by a vertical interval window generator 122 and a burst interval window generator 124. Vertical interval window generator 122 turns on an output signal at the beginning of the vertical interval and turns off the signal at the end of the vertical blanking interval. This signal is inputted to AND gate 112. When on, the data clock 102 is passed to store 106. When off, the data clock 102 is inhibited and video data 67 is not clocked into store 106.

Burst interval window generator 124 turns on at the beginning of each line of video data, because the VITC standard specifies that VITC data will occur after the burst interval. The generator turns off at the end of the burst interval. The output from this generator is inputted to an inverting input of AND gate 112. The effect of this signal is that from the beginning of each line until the end of the burst interval, the signal is on and forms a negative input to AND gate 112, thus inhibiting the clocking of data during this period.

Both these window generators can be implemented in a variety of ways. The preferred implementation is the same for both. A counter is coupled to a decoder. The counter is reset by one signal and a second signal is counted. The decoder turns on upon detecting a first specific count to start the window. The decoder looks for a second count to turn the output off, to mark the end of the window.

For the vertical interval window generator 122, the counter is reset by the V reference signal 74 and the H reference signal 76 is counted. On a count of 8, the decoder turns the output on. The first eight lines contain equalization data and cannot contain other signals, such as VITC data. After counting 22 lines, the decoder turns the output off.

For the burst interval window generator 124, the counter is reset by off-tape H reference 62 and the data clock signal 102 is counted. On the count of zero the decoder turns the output on. After counting a preset number of data clock pulses which extend to the end of the burst interval, the decoder turns the output off.

Referring still to FIG. 2, the operation of data clock generator 104 will be discussed. The function of data clock generator 104 is to produce data clock signal 102 which is at the rate of the binary data sought in video data 67. If video data 67 were read off tape at only play speed, data clock generator 104 could be simply a fixed oscillator. However, video tape 14 can be transported at a range of forward and reverse velocities past transducer 18 by tape transport 10 (all of FIG. 1). Data clock signal 102 must track the velocity of the tape over this range.

Data clock signal 102 must track the rate at which video data 67 is read off video tape 14 (FIG. 1) by transducer 18 (FIG. 1). This rate is directly related to the rate of rotation of the transducer 18 on scanner 20 combined with the rate of movement of video tape 14 (all of FIG. 1).

A reference signal taken off tape with the video data, such as off-tape H reference 62, bears this direct relationship between its rate and the data rate. The problem with off-tape H reference is that it becomes unreliable in shuttle speeds more than two to three times play speed. This is because, at those speeds, the cross-tracking of the head increases and a consistant H reference signal cannot be derived.

The solution to this problem is to avoid the use of a signal which must be read by the rotating transducer, but instead to use a signal related to speed of the tape, such as capstan tach signal 68. However, such a signal is not directly related to the rate video data as read by the transducer. Thus, such a signal related only to the speed of the tape must be adjusted to take into account the velocity of the scanner. Data clock generator 104 functions as a frequency converter to perform this adjustment.

In data clock generator 104, a tape speed detector 130 is fed capstan tach signal 68. Capstan tach signal 68 is compared to the 4 fsc reference signal to determine a tape speed value 132. The operation of data clock generator 104 will be discussed in detail with reference to FIG. 3 below. Tape speed value 132 is a numerical representation of speed of the tape alone. This number does not represent the rate video data is read off the tape, however because of a hardware constant (to be discussed with reference to FIG. 3) that is used in the generation of the tape speed value 132, this value takes into account the speed at which data was originally recorded.

Tape speed value 132 is fed to a tape to transducer velocity detector 134. A second input to this detector is capstan direction signal 70. Depending on capstan direction signal 70 one of two operations is performed by this detector. If the tape direction is forward, the tape speed value 132 is added to a numeric representative of the speed of the transducer 18 on scanner 20 (both of FIG. 1). This number is a constant because the scanner 20 (FIG. 1) velocity is fixed. If the tape direction is in reverse, the tape speed value 132 is subtracted from the numeric representation of the speed of the transducer 18 on scanner 20 (both of FIG. 1).

The output of tape to transducer velocity detector 134 is the tape to transducer velocity value 136. This number represents the rate video data is read off tape. The tape to transducer velocity value 136 is fed to pulse generator 138. Pulse generator 138 produces a periodic signal at the frequency specified by the tape to transducer velocity value 136.

Figure 3:
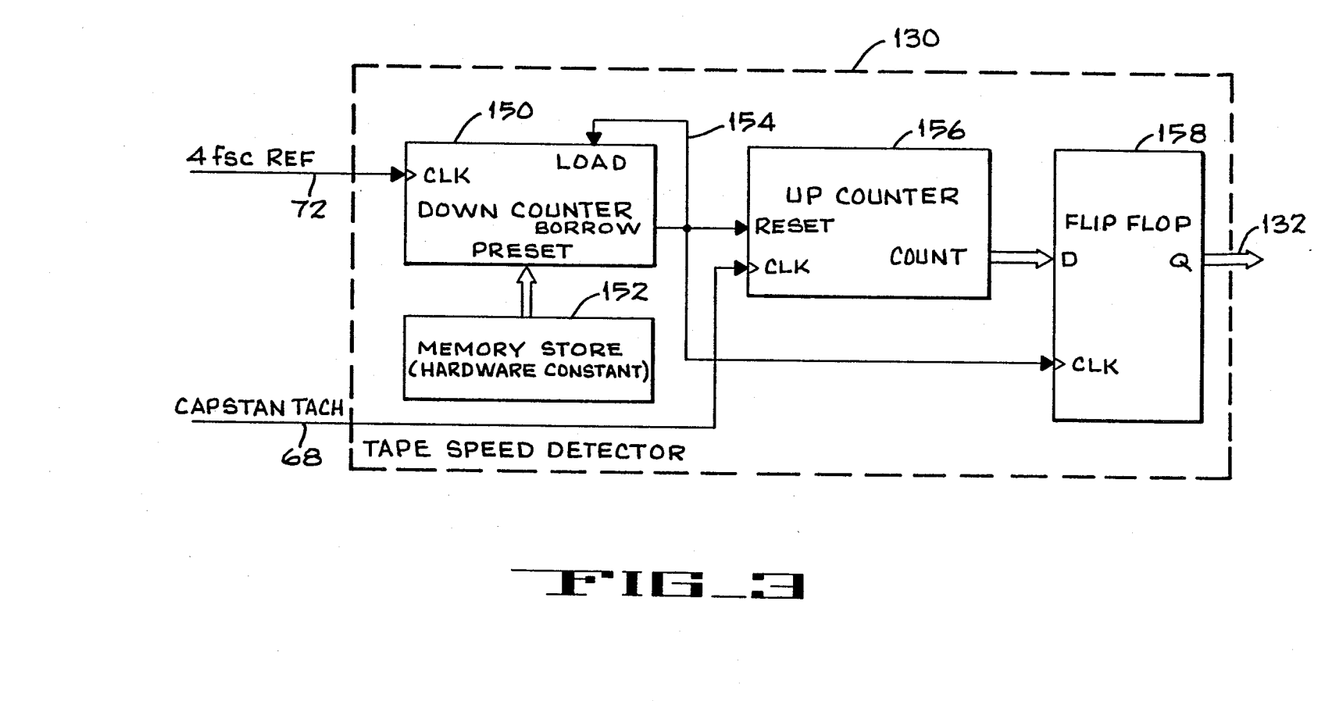
FIG. 3 is a simplified block diagram of a tape speed detector of FIG. 2.

The preferred implementation of tape speed detector 130 is shown in FIG. 3. Down counter 150 is used to create a reference clock for the detection of tape speed value 132. Down counter 150 is clocked by the 4 fsc reference signal 72 and effectively divides that clock down to the rate desired for tape speed detection.

Down counter 150 is loaded with a hardware constant supplied by memory store 152. This constant is dependent on the rate at which the data was recorded onto the tape, the record speed of the tape, the fixed scanner speed, and the resolution of the control signal, such as the capstan tach signal 68. From the resolution of the tachometer, the normal play speed of the tape and the velocity of the scanner, this constant can be derived. This constant can be permanently burned-in memory store 152, or alternatively it can be loaded from an outside controller to add flexibility to the data clock generator.

Down counter 150 counts down from the preset number until it reaches zero. It then issues a borrow signal, which serves as a tape speed detector clock signal 154. This signal is used in several ways. It is used to trigger a load command on down counter 150, so that the preset is reloaded.

Tape speed detector clock signal 154 is also used as a reset command for an up counter 156. The clock signal for this counter is capstan tach signal 68. Effectively, up counter 152 counts capstan tach pulses for a period specified by tape speed detector clock signal 154. The output of up counter 156 is a 6 bit binary number which will determine tape speed value 132. The output of up counter 156 is actually fed through flip-flop 158. Flip-flop 158 is clocked by tape speed detector clock signal 154 and functions as a latch to allow the tape speed value 132 to be available while up counter 156 is counting the next tape speed value.

Because the tape speed value is limited to six bits, the tape speed value describes the actual tape speed in terms of sixty four increments, where zero is tape stop and sixty three is highest detectable speed in shuttle in either direction.

Figure 4:
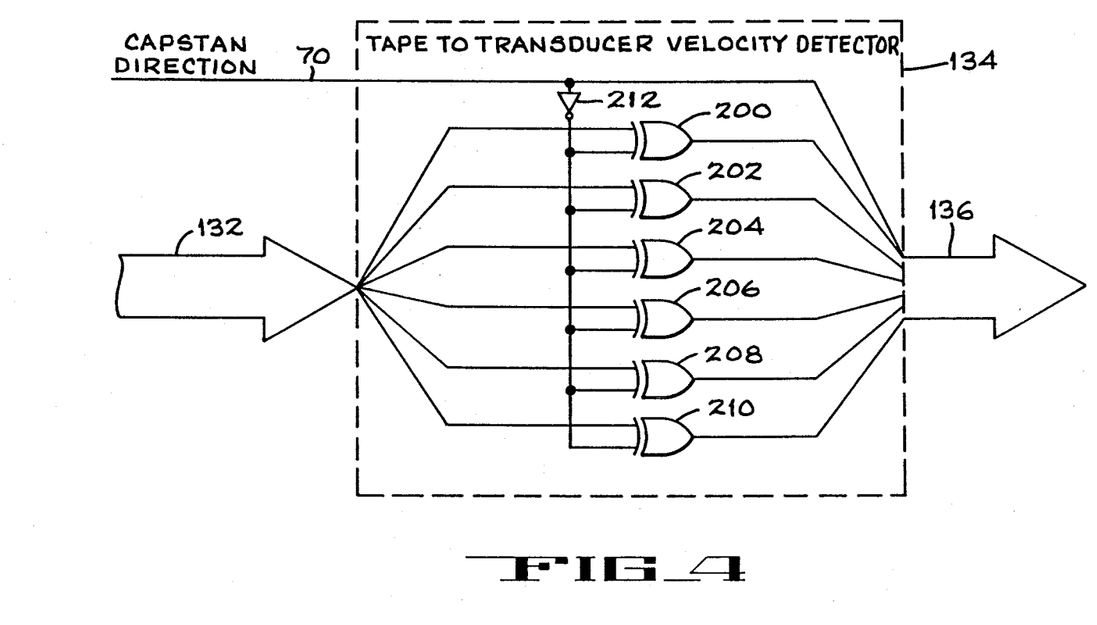
FIG. 4 is a schematic diagram of the tape to tranducer detector of FIG. 2.

Referring to FIG. 4, tape speed value 132 is fed to tape to transducer velocity detector 134. The preferred implementation of this detector is six exclusive OR gates 200, 202, 204, 206, 208 and 210. Each of the six bits of the tape speed value 132 is fed to one of these gates. The other input to these gates is the capstan direction signal 70, inverted by inverter 212. The output from this detector is the output from these six gates 200, 202, 204, 206, 208, 210, and the capstan direction signal 70 as a seventh, highest order bit.

The operation of this circuit is as follows. When the capstan direction signal 70 is high, indicating forward movement of tape, the exclusive OR gates 200, 202, 204, 206, 208, 210 pass the bits of the tape speed value 132 unaltered. The added seventh bit is outputted as a one. This effectively adds sixty four to the tape speed value 132. The value of the hardware constant in memory store 152 (of FIG. 3) has been chosen such that the value of sixty four is the effective speed of the scanner in relation to the tape speed value. Thus, the tape speed value 132 is added to sixty four, the effective scanner velocity value, to form the tape to transducer velocity value 136.

When the capstan direction is low, indicating reverse movement of tape, the exclusive OR gates 200, 202, 204, 206, 208, 210 invert each bit of the tape speed value 132. This effectively performs a ones complement operation on the tape speed value. The effect of performing a ones complement on these six bits is to subtract the tape speed value from sixty four, the scanner velocity value. The seventh bit is outputted as zero. The result of this operation is to subtract the tape speed value 132 from the scanner velocity of sixty four.

The output of tape to transducer velocity detector 134, tape to transducer velocity value 136, is a seven bit binary number allowing 128 increments in frequency available from pulse generator 138. Pulse generator 138 is preferably implemented as a rate multiplier. Each of the 128 increments of tape to transducer velocity value 136 specifies a certain frequency based on a clock of the 4 fsc reference signal. Rate multipliers of this type are well known to those skilled in the art. The preferred implementation is described in the TTL Data Book for Design Engineers published by Texas Instruments. Integrated circuit type SN7497 is a Binary Rate Multiplier described on pages 7-102 to 7-106. The output of pulse generator 138 is data clock 102.

The complete operation of the system in FIGS. 1 through 3 will now be described. The generation of data clock 102 (FIG. 2) is in parallel with the reading of the video information off tape. The generation of data clock 102 will be discussed first.

Referring to FIG. 1, as capstan 22 regulates the velocity of video tape 14, its tachometer generates signals which are decoded by tachometer decoder 71 into capstan tach signal 68 and capstan direction signal 70.

Referring to FIG. 2, tape speed detector 130 generates a tape speed value 132 based on capstan tach signal 68 and clocked by the 4 fsc reference signal. Tape speed value 132, which represents the speed of the tape alone, is added to, or subtracted from the velocity of the scanner 20 (FIG. 1), depending on the direction of tape movement, as specified by capstan direction signal 70. This operation is performed by tape to transducer velocity detector 134, which outputs tape to transducer velocity value 136. This value represents the rate at which video information is being read off tape, and is used by pulse generator 138 to produce data clock 102.

Referring back to FIG. 1, transducer 18 reproduces video information from video tape 14. That video information is processed by reproduce signal processor 56 and demodulated by demodulator 58. The output of demodulator 58 is used by sync separator 60 to produce the off-tape H reference signal. The output of demodulator 58 is also used by threshold detector 66 to produce video data 67.

Referring again to FIG. 2, video data 67 is read into store 106 according to a clock signal based on data clock 102 and a number of other conditions. The store 106 is cleared at the start of the vertical interval by V reference signal 74. A window, including the vertical interval, but excluding the beginning of each line until the end of the burst interval is generated by window generator 120. If the incoming video data 67 is within the vertical interval, but not within the interval from the beginning of each line to the end of the burst interval, and a desired bit pattern has not previously been detected in this vertical interval, then video data 67 is clocked into store 106 according to data clock 102.

As video data 67 is clocked into store 106, bit pattern detector 108 is checking the contents of store 106 for the desired pattern. When the desired pattern is detected, the contents of store 106 are copied into latch 110, and a data valid signal 82 is outputted. Data utilization device 78 (FIG. 1) reads the extracted data when the data valid signal 82 indicates that data has been extracted.

Although the present invention has been described with reference to the illustrated embodiments, the disclosure should not be interpreted as limiting. Various other alterations and modifications will no doubt become apparent to those skilled in the art after having read the preceding disclosure. For example, it should be clear from the forgoing discussion that the system described in the figures can be utilized to extract information other than VITC information. In view of such variations, and others, it is intended that the appended claims be interpreted as covering all alternative embodiments and equivalents as fall within the spirit and scope of the present invention.

I claim:

1. Apparatus for extracting binary signals included in the vertical blanking intervals of a video signal reproduced from a tape transported over a range of velocities past a transducer retated at a fixed velocity relative to the tape, said video signal reproduced at a rate which varies as a function of the tape velocity to the transducer velocity, each binary signal having a selected number of bits at regular intervals with each bit represented by one of two signal amplitude levels, certain of the bits of each binary signal at the same level to form a known bit pattern in each binary signal, and each binary signal having a bit rate which varies as the rate of reproduction of the video signal, comprising:

means for generating a control signal having a rate proportional to the velocity at which the tape is transported past the transducer;
means for supplying a direction signal indicative of the direction of tape movement;
a clock generator responsive to the control signal and the direction signal for generating a clock signal having a rate corresponding to the bit rate at which the binary signal is reproduced from the tape by the transducer as said tape is transported in a selected direction at a seleclted velocity within said range of velocities;
means responsive to the video signal reproduced by the transducer for generating a stream of binary data therefrom having a first level corresponding to one of said two signal amplitude levels when said video signal has an amplitude above a selected reference level, and a second level corresponding to the other of said two signal amplitude levels when said video signal has an amplitude below the selected reference level; and
a binary signal detector coupled to receive the stream of binary data and the clock signal, said detector responsive to said clock signal and the occurrence of the known bit pattern of the binary signal for detecting the occurrence of the binary signal in the received stream of binary data.

2. The apparatus of claim 1 wherein said means for generating a control signal comprises a tachometer mechanically coupled to the transported tape.

3. The apparatus of claim 1 wherein said means for generating a control signal comprises a tachometer mechanically coupled to a capstan.

4. The apparatus of claim 1 wherein said clock generator comprises:

a tape speed detector responsive to the control signal for producing an output indicative of tape speed;
a tape to transducer velocity detector responsive to the tape speed detector output and to the direction signal for the producing an output indicative of tape to transducer velocity; and
a pulse generator responsive to the tape to transducer velocity detector output for generating the clock signal having a rate corresponding to the bit rate at which the binary signal is reproduced from the tape.

5. The apparatus of claim 1 wherein said binary signals are non-self-clocking.

6. The apparatus of claim 1 wherein said binary signals comprise vertical interval time code.

7. The apparatus of claim 1 further comprising inhibit means for selectively inhibiting the clock signal.

8. The apparatus of claim 7 further comprising means for activating said inhibit means outside the vertical blanking interval.

9. The apparatus of claim 8 further comprising means for activating said inhibit means during selected periods within the vertical blanking interval.

10. Apparatus for extracting binary signals occurring in an information signal reproduced from a tape transported over a range of velocities and in forward or reverse directions past a transducer rotated at a fixed velocity relative to the tape, said information signal reproduced at a rate which varies as a function of the tape velocity to the transducer velocity, each binary signal having a selected number of bits at regular intervals with certain of the bits forming a known bit pattern in each binary signal, and each binary signal having a bit rate which varies as the rate of reproduction of the information signal, comprising:

means for generating a control signal having a rate proportional to the velocity at which the tape is transported past the transducer;
means for supplying signal indicative of the direction that the tape is being transported;
a clock generator responsive to the control signal and the direction signal for generating a clock signal having a rate corresponding to the bit rate at which the binary signal is reproduced from the tape by the transducer as said tape is transported in said direction at the velocity proportional to the control signal rate; and a binary signal detector coupled to receive the reproduced information signal, and responsive to said clock signal and the occurrence of the known bit pattern, for detecting the occurrence of the binary signal in the received information signal.

11. The apparatus of claim 10 including:
means for providing a timing window of selected time interval during which the binary signal detector is allowed to detect the occurrence of the binary signal.

12. The apparatus of claim 11 including:
means responsive to the clock signal for storing the reproduced information signal when the storing means is enabled by the timing window.

13. The apparatus of claim 10 wherein the clock generator includes:
means receiving the control signal for generating a relative tape to transducer velocity signal in response to the direction signal; and
means responsive to the relative tape to transducer velocity signal for generating said clock signal at said rate.

14. A method for extracting binary signals occurring in an information signal reproduced from a tape transported over a range of tape velocities past a transducer rotated at a fixed velocity relative to the tape, said information signal being reproduced at a rate which varies as the tape transport velocity varies, each binary signal having a selected number of bits at regular intervals with certain of the bits forming a known bit pattern in each binary signal, and each binary signal having a bit rate which varies as the rate of reproduction of the information signal, comprising:
supplying control signals indicative of the velocity and direction of the tape transport as the information signal is reprdouced from the tape;
generating in response to the control signals a relative signal indicative of the relative tape to transducer velocity and of the direction of the tape;
generating in response to the relative signal a timing signal having a rate corresponding to the rate at which the information signal is reproduced from the tape over said range of tape velocities;
examining the reproduced information signal at the rate of the timing signal; and
identifying the ocurrence of the binary signal in the reproduced information signal upon examination of an interval of reproduced information signal that includes the known bit pattern.

15. The method according to claim 14 wherein the bits forming the known bit pattern are distributed over a specified interval in each binary signal, and the examining step includes periodically examining successive intervals of the reproduced information signal with the examined interval at least equal to the specified interval, each successive interval of reproduced information signal examined displaced from a previously examined interval of reproduced information signal by an amount corresponding to a bit interval of the binary signal.

16. The method of claim 14 including:
providing a timing window during which said examining of the reproduced information signal is enabled in response to the timing signal.

17. The method of claim 14 wherein the step of supplying includes;
mechanically coupling a velocity detector to the tape transport to supply a control value indicative of the tape velocity; and
supplying a direction signal indicative of the direction of movement of the tape transport.

18. The method of claim 17 wherein the step of generating the timing signal includes:
adding the tape velocity control value to the transducer fixed velocity in response to a forward tape movement direction; and
subtracting the tape velocity control value from the transducer fixed velocity in response to a reverse tape movement direction.

19. Apparatus for extracting binary signals included in the vertical blanking intervals of a video signal reproduced from a tape transported over a range of velocities past a transducer rotated at a fixed velocity relative to the tape, the velocity of tape transport and the velocity of rotation of the transducer defining a relative tape to transducer velocity that varies as the velocity of tape transport varies, said video signal reproduced at a rate which varies as the relative tape to transducer velocity varies, each binary signal having a selected number of bits at regular intervals with each bit represented by one of two signal amplitude levels, certain of the bits of each binary signal at the same levels to form a known bit pattern in each binary signal, and each binary signal having a bit rate which varies as the rate of reproduction of the video signal, comprising:
means for generating a control signal having a rate proportional to the velocity at which the tape is transported past the transducer;
a clock generator responsive to the control signal for generating a clock signal having a rate corresponding to the bit rate at which the binary signal is reproduced from the tape by the transducer as said tape is transported at the velocity proportional to the control signal rate;
wherein said clock generator comprises a tape speed detector responsive to the control signal for producing an output corresponding to tape speed, a tape to transducer velocity detector responsive to the tape speed detector output for producing an output corresponding to tape to transducer velocity, and a pulse generator responsive to the tape to transducer velocity detector output for generating said clock signal;
wherein said tape speed detector further comprisess, a down counter responsive to a reference clock for generating a tape speed detector clock, and an up counter responsive to the control signal for producing a tape speed value, the up counter being reset by the tape speed detector clock;
means responsive to the video signal reproduced by the transducer for generating a stream of binary data therefrom having a first level corresponding to one of said two signal amplitude levels when said video signal has an amplitude above a selected reference level and a second level corresponding to the other of said two signal amplitude levels when said video signal has an amplitude below the selected reference level;
a binary signal detector coupled to receive the stream of binary data and the clock signal, said detector responsive to said clock signal and the occurrence of the known bit pattern of the binary signal for detecting the occurrence of the binary signal in the received stream of binary data; and
a decoder coupled to receive and decode the detected binary signal.

20. Apparatus for extracting binary signals included in the vertical blanking intervals of a video signal reproduced from a tape transported over a range of velocities past a transducer rotated at a fixed velocity relative to the tape, the velocity of tape transport and the velocity of rotation of the transducer defining a relative tape to transducer velocity that varies as the velocity of tape transport varies, said video signal reproduced at a rate which varies as the relative tape to transducer velocity vasries, each binary signal having a selected number of bits at regular intervals with each bit represented by one of two signal amplitude levels, certain of the bits of each binary signal at the same levels to form a known bit pattern in each binary signal, and each binary signal having a bit rate which varies as the rate of reproduction of the video signal, comprising:

means for generating a control signal having a rate proportional to the velocity at which the tape is transported past the transducer;

a clock generator responsive to the control siganl for generating a clock signal having a rate corresponding to the bit rate at which the binary signal is reproduced from the tape by the transducer as said tape is transported at the velocity proportional to the control signal rate;

wherein said clock generator comprises a tape speed detector responsive to the control signal for producing an output corresponding to tape speed, a tape to transducer velocity detector responsive to the tape speed detector output from producing an output corresponding to tape to transducer velocity, and a pulse generator responsive to the tape to transducer velocity detector output for generating said clock signal;

transducer velocity means for producing an output corresponding to transducer velocity, wherein said tape to transducer velocity detector comprises means for combining the tape speed detector output with the transducer velocity means output to produce the tape to transducer velocity;

means responsive to the video signal reproduced by the transducer for generating a stream of binary data therefrom having a first level corresponding to one of said two signal amplitude levels when said video signal has an amplitude above a selected reference level and a second level corresponding to the other of said two signal amplitude levels when said video signal has an amplitude below the selected reference level;

a binary signal detector coupled to receive the stream of binary data and the clock signal, said detector responsive to said clock signal and the occurence of the known bit pattern of the binary signal for detecting the occurrence of the binary signal in the received stream of binary data; and a decoder coupled to receive and decode the detected binary signal.

* * * * *